United States Patent
Kelly

(10) Patent No.: US 6,557,126 B1
(45) Date of Patent: Apr. 29, 2003

(54) METHOD AND APPARATUS FOR CALIBRATING WRITE POWER

(75) Inventor: John J. Kelly, Menlo Park, CA (US)

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/495,227

(22) Filed: Jan. 31, 2000

(51) Int. Cl.⁷ .......................... G11B 20/18; G11B 27/36
(52) U.S. Cl. .......................... 714/708; 369/54; 369/116
(58) Field of Search .................... 714/708; 369/54, 369/116

(56) References Cited

U.S. PATENT DOCUMENTS

| | | | | | |
|---|---|---|---|---|---|
| 4,894,817 | A | * | 1/1990 | Tanaka et al. | 235/438 |
| 5,341,360 | A | * | 8/1994 | Johann et al. | 369/116 |
| 5,559,785 | A | * | 9/1996 | Honda et al. | 369/116 |
| 5,602,814 | A | * | 2/1997 | Jaquette et al. | 369/116 |
| 5,623,472 | A | * | 4/1997 | Bakx et al. | 369/13.27 |
| 5,777,964 | A | * | 7/1998 | Furuta et al. | 369/116 |
| 5,790,491 | A | * | 8/1998 | Jaquette et al. | 369/116 |
| 5,872,763 | A | * | 2/1999 | Osakabe | 369/47.53 |
| 5,978,351 | A | * | 11/1999 | Spruit et al. | 369/275.2 |
| 6,115,350 | A | * | 9/2000 | Furuta et al. | 369/47.53 |
| 6,269,062 | B1 | * | 7/2001 | Minemura et al. | 369/47.53 |
| 6,275,462 | B1 | * | 8/2001 | Masaki et al. | 369/116 |
| 6,331,966 | B1 | * | 12/2001 | Minami et al. | 369/13.07 |
| 6,434,106 | B1 | * | 8/2002 | Ohtsuka | 369/116 |

* cited by examiner

*Primary Examiner*—Stephen M. Baker
(74) *Attorney, Agent, or Firm*—Pennie & Edmonds LLP

(57) ABSTRACT

A method determines a power value for writing data on a disk. Write-patterns are written on the disk, and each write-pattern is written at an associated power value. For each write-pattern of at least a subset of the write-patterns, the write-pattern is read, a bit error corresponding to the write-pattern is determined to generate a calibration profile of associated bit errors and power values, and a selected power value is designated based on the calibration profile. In one embodiment, the selected power value is designated based on both the calibration profile and an asymmetry value associated with each write-pattern. In another embodiment, the selected power value is designated based on both the calibration profile and a gamma value associated with each write-pattern.

23 Claims, 12 Drawing Sheets

Method of Designating the Write Power Level

RF Signal

Block Diagram of a Disk Drive System

Sled Carriage

Block Diagram of a Disk Drive System

CIRC ENCODER

CIRC DECODER

Method of Designating the Write Power Level

266

272 Determine a first write power level associated with the smallest asymmetry value in the asymmetry table.

274 Identify the smallest number of bit errors in the calibration table.

276 Determine a first threshold number of bit errors based on the smallest number of bit errors.

278 Determine first and second write power breakpoints of the calibration curve based on the first threshold number of errors.

286 Determine the number of write power increments between the first and second write power breakpoints.

288 If the number of write power increments is less than a predetermined number of write power increments, designate the first write power level as the selected power level.

290 If the number of write power increments is greater than or equal to the predetermined number of write power increments, determine an average write power value associated with an average of the value of the write power at the first and the second breakpoints and designate the average write power value as the selected power level.

Method of Designating the Write Power Level

FIG. 14

Method of Designating the Write Power Level

METHOD AND APPARATUS FOR CALIBRATING WRITE POWER

BRIEF DESCRIPTION OF THE INVENTION

This invention relates generally to disk drive systems. More particularly, this invention relates to a method and apparatus for determining an amount of power at which to write information to an optical disk.

BACKGROUND OF THE INVENTION

Personal computers typically connect to an optical disk drive such as a CD-ROM to read data from a compact disk. On the compact disk, data is stored in the form of pits and lands patterned in a radial track. The track is formed in one spiral line extending from the inner radius of the disk to the outer edge. A pit is a location on the disk where data has been recorded by creating a depression in the surface of the disk with respect to the lands. The lands are the areas between the pits in the tangential direction. The reflectivity of the pits is less than the reflectivity of the lands. To store audio or digital information, the length of the pits and lands are controlled according to a predefined encoding format.

When reading information from the disc, light from a laser beam is directed onto the track and the light beam is reflected back to a photo-sensor. Since the pits and lands have different reflectivity, the amount of reflected light changes at the transitions between the pits and the lands. In other words, the encoded pattern of the pits and lands modulates the reflected light beam. The photo-sensor receives the reflected light beam, and outputs a modulated signal, typically referred to as an RF signal, that is proportional to the energy of the light in the reflected light beam.

In FIG. 1, relationship of the RF signal to the pits 26 and lands 28 is shown. A smaller pit 26 or land 28 decreases both the period and the amplitude of the RF signal. The RF signal in the pits 26 and lands 28 has opposite polarity.

One encoding format used in optical disk systems is eight-to-fourteen modulation (EFM). EFM reduces errors by minimizing the number of zero-to-one and one-to-zero transitions. In other words, small pits are avoided. A zero is indicated by no change in the energy of the reflected beam for at least two clock periods. A one is indicated by a change in the energy of the reflected light beam, that is, a pit edge. Applying the EFM encoding rules, a pit or land will have a length corresponding to an amount of time for at least three and up to eleven clock periods and the electronics will output a corresponding voltage as shown in FIG. 1.

When reading data, the RF signal needs to be decoded into a serial digital data signal. In one circuit, to decode the analog RF signal, a comparator compares the RF signal to a reference voltage to generate a digital data signal.

To write data to a CD-Recordable (CD-R) or a CD-Rewritable (CD-RW) disk, power is supplied to the laser which heats and melts a portion of the disk surface to create the pits. The optimum amount of power to supply to the laser depends on the characteristics of the disk, the optics, the laser, the temperature and the recording speed. The amount of write power is determined for each combination of recorder and recording speed at the time of recording.

When reading recorded data, the RF signal may be asymmetrical with respect to a predetermined reference voltage. For data written at different amounts of write power, when read, the amount of asymmetry in the corresponding RF signal varies in accordance with the amount of write power. To determine the optimum write power, random EFM data is recorded at different write powers. The recorded data is read back and the asymmetry of the data written at each write power is measured based on the peak voltage levels of the analog RF signal.

In FIG. 2, three RF signals 30-1, 30-2, 30-3 are shown. The data associated with each RF signal 30 was recorded at different write power levels. A line 36 representing a reference voltage is also shown. The highest peaks $A_1$ represent the RF signal at a land, while the lowest peaks $A_2$ represent the RF signal at a pit. Each waveform also shows the corresponding peak levels $A_1$ and $A_2$ for each waveform. Waveform one 30-1 was written at a write power much less than an optimum power level. Waveform two 30-2 was written at a write power equal to the optimum power level. Waveform three 30-3 was written at a write power much greater than the optimum power level.

Ideally, in a CD-R disk drive, the asymmetry is measured in terms of a parameter called Beta $\beta$ which is the difference between the peak levels $A_1$ and $A_2$ of the analog RF signal normalized to the peak-to-peak value. In other words, Beta $\beta$ is defined in accordance with relationship one as follows:

$$\beta = \frac{(A_1 + A_2)}{(A_1 - A_2)} \quad (1)$$

The optimum write power is associated with the value of Beta $\beta$ closest to or equal to zero. A peak-bottom-hold circuit supplies digital values of the peak voltages, $A_1$ and $A_2$, to a processor which determines the value of Beta in accordance with relationship one, above.

In practice, in a CD-R disk drive, the value of Beta $\beta$ is determined in accordance with relationship two as follows:

$$\beta = \frac{(P + B - 2V_{REF})}{(P - B)} \quad (2)$$

where P is the peak voltage, B is the bottom voltage. To provide a valid measure of Beta $\beta$, the peak and bottom values should not have any DC bias. To measure the amount of DC bias in the peak and bottom signals, a low-pass filter filters the RF signal to provide a value $V_{REF}$ representing the DC bias. To remove the DC bias, in the numerator, $V_{REF}$ is subtracted twice—once from the peak value P and once from the bottom value B.

Ideally, in a CD-RW disk drive, a parameter called Gamma $\gamma$ is used to determine the optimum write power, rather than Beta $\beta$. Gamma $\gamma$ is the normalized slope of the modulation amplitude m of the RF signal with respect to write power Pw. The modulation amplitude m of the RF signal is determined in accordance with relationship three as follows:

$$m = \frac{I_{11}}{I_{top}}. \quad (3)$$

$I_{11}$ is equal to the peak-to-peak value of the RF signal at the lowest predetermined frequency. $I_{top}$ is the envelope of the $I_{11}$ "high" signal levels of the RF signal. The envelope is provided by a 100 Hz low-pass filter. The normalized slope of the modulation amplitude m with respect to the write power, that is, Gamma $\gamma$, is determined in accordance with relationship four as follows:

$$\gamma = \left(\frac{\partial m}{\partial WritePower}\right) \cdot \left(\frac{WritePower}{m}\right). \quad (4)$$

In practice, the modulation amplitude m for data written at each write power is determined in accordance with relationship five as follows:

$$m = \frac{(PeakAverage - Bottom)}{(Peak - Bottom)}. \quad (5)$$

Peak is the largest peak value of the RF signal; Bottom is the lowest value of the RF signal; and, Peak Average is the average of the peak values for the data. The slope of the modulation amplitude m with respect to the write power, that is, Gamma γ, is determined in accordance with relationship six as follows:

$$\gamma = \frac{\left(\frac{\Delta m}{m}\right)}{\frac{(\Delta WritePower)}{WritePower}}. \quad (6)$$

Data is written consecutively at increasing levels of write power. The change in modulation amplitude (Δm) is the difference in modulation amplitude m between data written at consecutive write power levels. The change in Write Power (ΔWrite Power) is the difference between consecutive values of write power.

After determining Gamma γ for a predetermined number of write power levels, the value of Gamma 'γ' that is closest to the value of a predefined Gamma-target $\gamma_{target}$ is identified. The value of the write power $P_{target}$ associated with Gamma 'γ' is determined. The optimum write power $P_{WO}$ and erase power $P_{EO}$ are determined in accordance with relationships seven and eight, respectively, as follows:

$$P_{WO} = \rho \cdot P_{target} \quad (7)$$

$$P_{EO} = \epsilon \cdot P_{WO} \quad (8)$$

The symbol ρ is a predefined multiplication factor to determine the optimum write power $P_{WO}$, and ε is the erase/write power ratio. The values of $\gamma_{target}$, ρ and ε are predefined and recorded on the disk.

When data is read from the optical disk, that data may have bit errors despite determining the amount of write power based on the value of Beta β and Gamma γ, depending on the type of disk drive. The bit errors are detected by an error-detection circuit different from the circuits that provide the respective values of Beta β and Gamma γ. The error-detection circuit may check an error correction code embedded in the data for errors. The prior art methods using the values Beta β and Gamma γ, described above, do not consider the bit errors of the data when determining the write power.

In view of the foregoing, it would be desirable to provide a method and apparatus that selects a write power in accordance with the bit errors of the data.

SUMMARY OF THE INVENTION

A method determines a power value for writing data on a disk. Write-patterns are written on the disk, and each write-pattern is written at an associated power value. For each write-pattern of at least a subset of the write-patterns, the write-pattern is read, a bit error corresponding to the write-pattern is determined to generate a calibration profile of associated bit errors and power values, and a selected power value is designated based on the calibration profile.

In one embodiment, the selected power value is designated based on both the calibration profile and an asymmetry value associated with each write-pattern. In another embodiment, the selected power value is designated based on both the calibration profile and the slope of the modulation amplitude of the RF signal with respect to write power.

A circuit determines a power value for writing data on a disk. A write circuit writes a set of write-patterns on the disk at associated power values. An error detector determines the number of bit errors for at least a subset of the set of write-patterns. An executing module designates a selected power value based on the number of bit errors for each write-pattern of the subset of write-patterns.

By designating the write power based on the number of bit errors of the data, the invention more closely associates write power with the bit errors; therefore, the number of bit errors of the data may be reduced.

BRIEF DESCRIPTION OF THE DRAWINGS

For a better understanding of the invention, reference should be made to the following detailed description taken in conjunction with the accompanying drawings, in which:

FIG. 14 is a flowchart of the method of designating the write power level of FIG. 11 in accordance with an alternate embodiment of the present invention.

Like reference numerals refer to corresponding parts throughout the drawings.

DETAILED DESCRIPTION OF THE INVENTION

Figure 1:
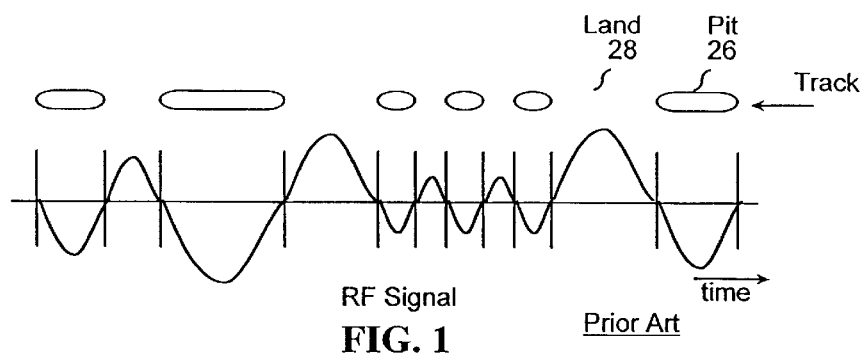
FIG. 1 illustrates the relationship between an analog RF signal and the pits and lands on a disk.
Figure 3:
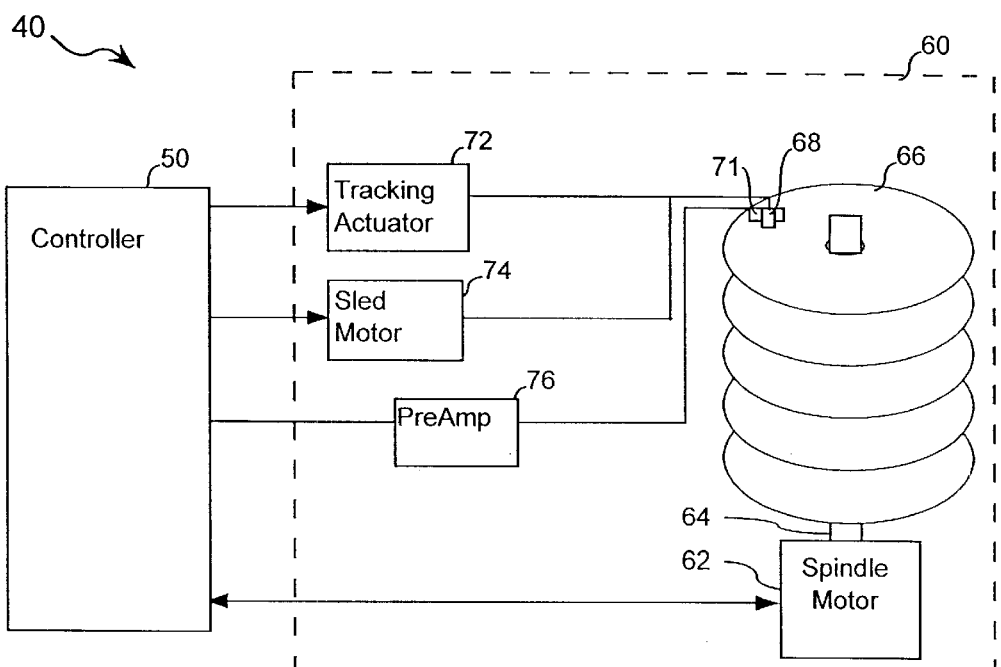
FIG. 3 illustrates a general architecture of a disk drive system in accordance with an embodiment of the present invention.

In FIG. 3, a disk drive system 40 has a controller unit 50 that connects to a disk drive 60 such as an optical disk drive. In the optical disk drive 60, a spindle motor 62 is attached to a spindle 64 which supports at least one disk 66. In response to commands from the controller unit 50, the spindle motor 62 rotates the spindle 64 and therefore the disk 66.

Figure 4:
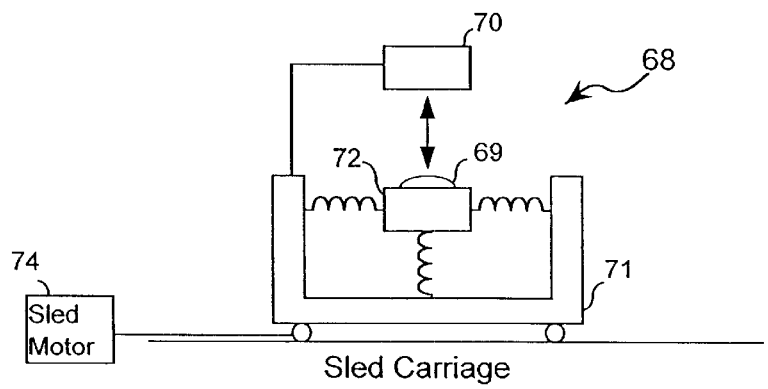
FIG. 4 illustrates a lens mounted in a tracking actuator on a sled of FIG. 2.
Figure 2:
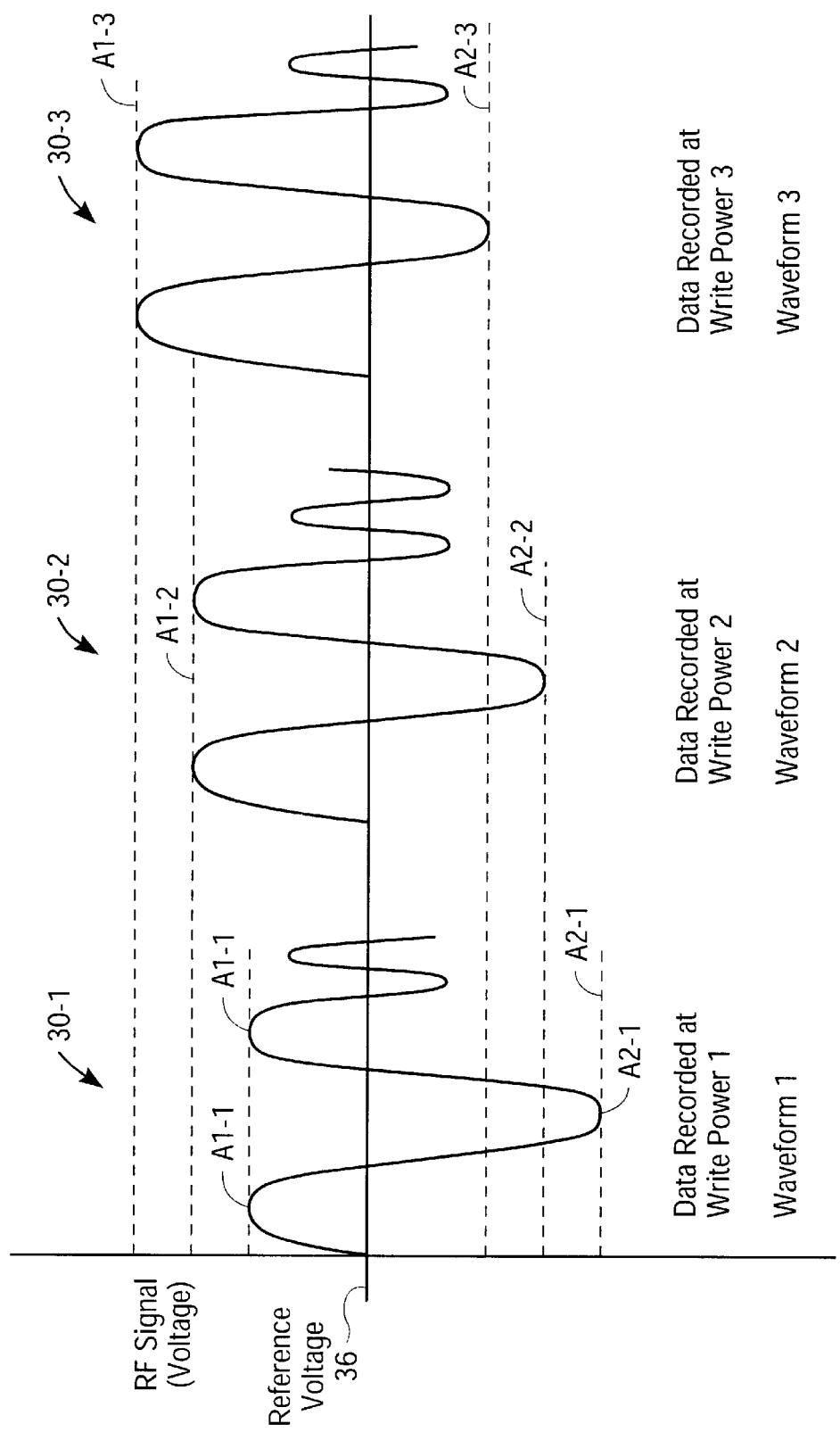
FIG. 2 illustrates the relationship between an analog RF signal and a reference voltage for waveforms written at different write powers.

While the disk 66 is rotating, an optical head 68 transmits information from or writes information to the disk 66. Referring also to FIG. 4, the optical head 68 includes a lens 69 and a photo-sensor 70. The lens 69 directs the reflected light beam to the photo-sensor 70. The head 68 is mounted on a sled 71. A tracking actuator 72 is coupled to the lens 69 and moves the lens 69 within the confines of the sled 71. The tracking actuator 72 may be a voice coil motor. A sled motor 74 moves the sled 71.

Referring back to FIG. 3, the controller 50 controls the sled 71 and the tracking actuator 72 to position the head 68 and lens 69, respectively, with respect to a target track on the disk 66. On rough searches, the sled motor 74 is the prime mover of the lens 68. On fine searches, the tracking actuator 72 is the prime mover of the lens 69. A rough search is a long search in which the lens 69 position is changed by 300 tracks or more by moving the sled, while a fine search is a short search in which the lens 69 position is changed by less than 300 tracks using the tracking actuator 72.

A preamplifier 76 amplifies the analog RF signal output from the head 68. In this description, the output of the preamplifier 76 will be referred to as the analog RF signal.

Figure 5:
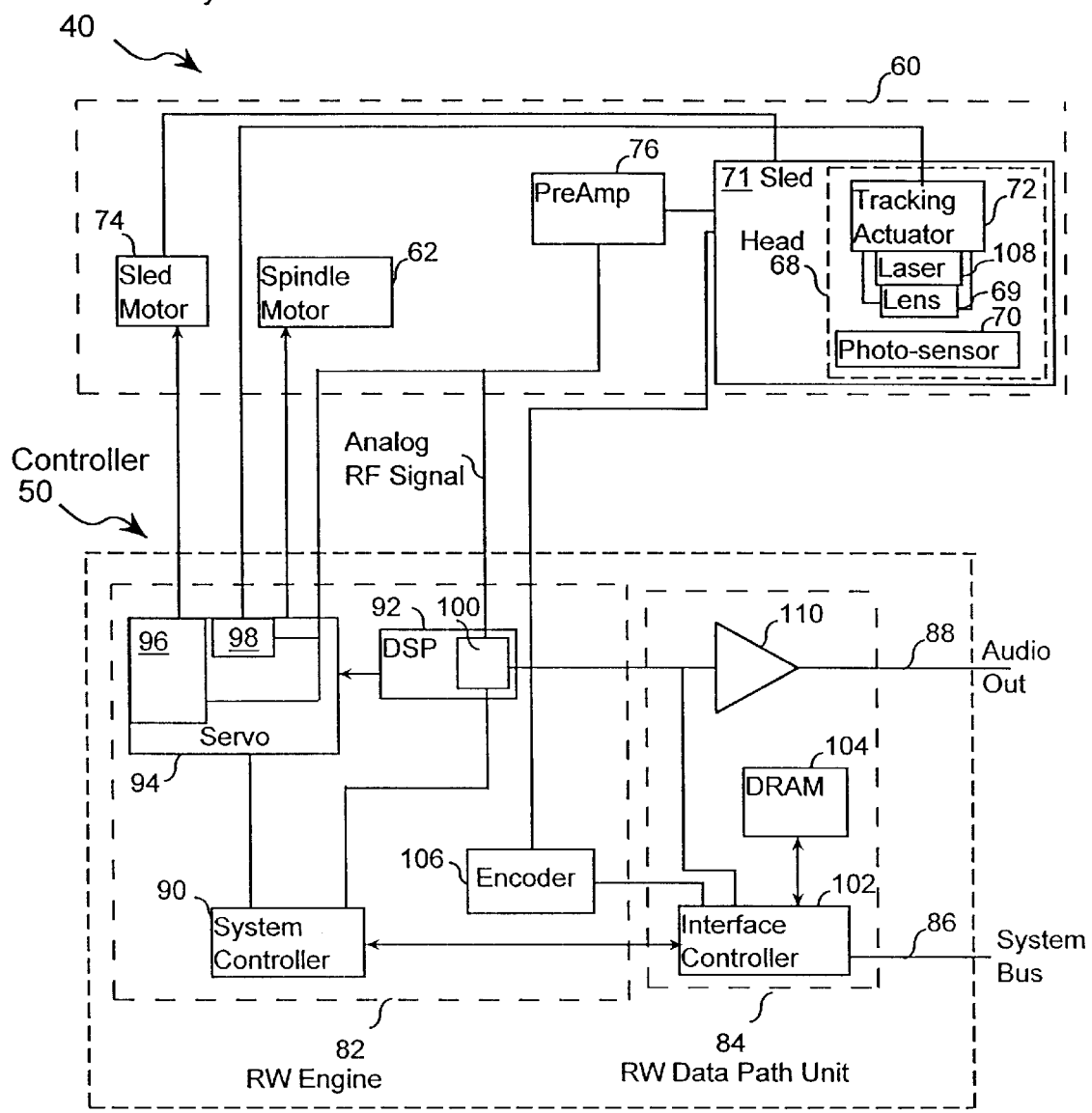
FIG. 5 illustrates a more detailed architecture of a disk controller in accordance with an embodiment of the present invention.

FIG. 5 is a more detailed block diagram of the disk drive system 40 including the disk controller 50 and its associated disk drive 60. The disk controller 50 has a read/write (RW) engine 82 that connects to a read/write (RW) data path unit 84. The RW engine 82 communicates directly with the disk drive 60 while the RW datapath unit 84 communicates with a system bus 86 and supplies an audio signal to an audio output line 88.

The RW engine 82 has a system controller 90, a digital signal processor 92 and a servo control unit 94. The system controller 90 receives commands from and sends status to the system bus 86 via the RW datapath unit 84. In response to the commands from the system bus 86, the system controller 90 sends commands to and receives status information from the digital signal processor (DSP) 92 and the servo control unit 94 to read data from or write data to the disk.

The servo control unit 94 positions the head with respect to a target track, and then keeps the lens 69 centered and focused on the target track based on signals received via the lens 69 and the DSP 92. The servo control unit 94 sends signals to the tracking actuator 72, the sled motor 74 and spindle motor 62 to control tracking, disk rotation and focusing. The servo control unit 94 communicates with the sled motor 74 and the tracking actuator 72 to position the optical head 68 and lens 69 precisely with respect to the spiral track to read the desired information from the disk 66. In particular, in the servo control unit 94, a sled motor driver 96 controls the sled motor 74 with a sled motor drive signal; and, an actuator driver 98 controls the tracking actuator 72 with an actuator drive signal.

The DSP 92 receives the analog RF signal from the preamplifier 76. The analog RF signal includes both digital data and control information. The DSP 92 processes the analog RF signal and outputs control signals that are used by the servo control unit 94. The DSP 92 also outputs a data signal. In the DSP 92, the analog RF signal is converted to a digital data signal, that is, a digital RF signal. A signal analysis block 100 includes a detector that supplies digital values of the peak, bottom, average and DC levels of the RF signal which are subsequently used to determine the value of Beta $\beta$, or Gamma $\gamma$, depending on the type of disk drive. The signal analysis block 100 also includes a bit error detector that generates the number of bit errors associated with the data signal.

To write data to a disk, in the read/write data path unit 84, an interface controller 102 receives the data from the system bus 86, processes the data, and stores the data in the DRAM 104. The interface controller 102 sends the data bytes from the DRAM 104 to an encoder 106 in the RW engine 82. The encoder 106 encodes the data bytes using the EFM format and outputs signals to the disk drive 60 to control the laser 108 to write data on the disk.

When reading data from the disk, the DSP 92 receives the analog RF signal and outputs a digital data signal. The interface controller 102 receives the digital data signal from the DSP 92 in a serial stream, descrambles the data, and assembles the data into eight-bit bytes. The interface controller 102 then stores the data in the DRAM 104. The DRAM 104 acts as a buffer for the digital data from the DSP 92. The interface controller 102 also performs error detection and correction operations on the buffered data and transfers the data to the system bus 86.

To provide an audio output, a digital-to-analog converter (DAC) 110 receives the digital data signal from the DSP 92 and outputs an audio signal on the audio output line 88.

Figure 6:
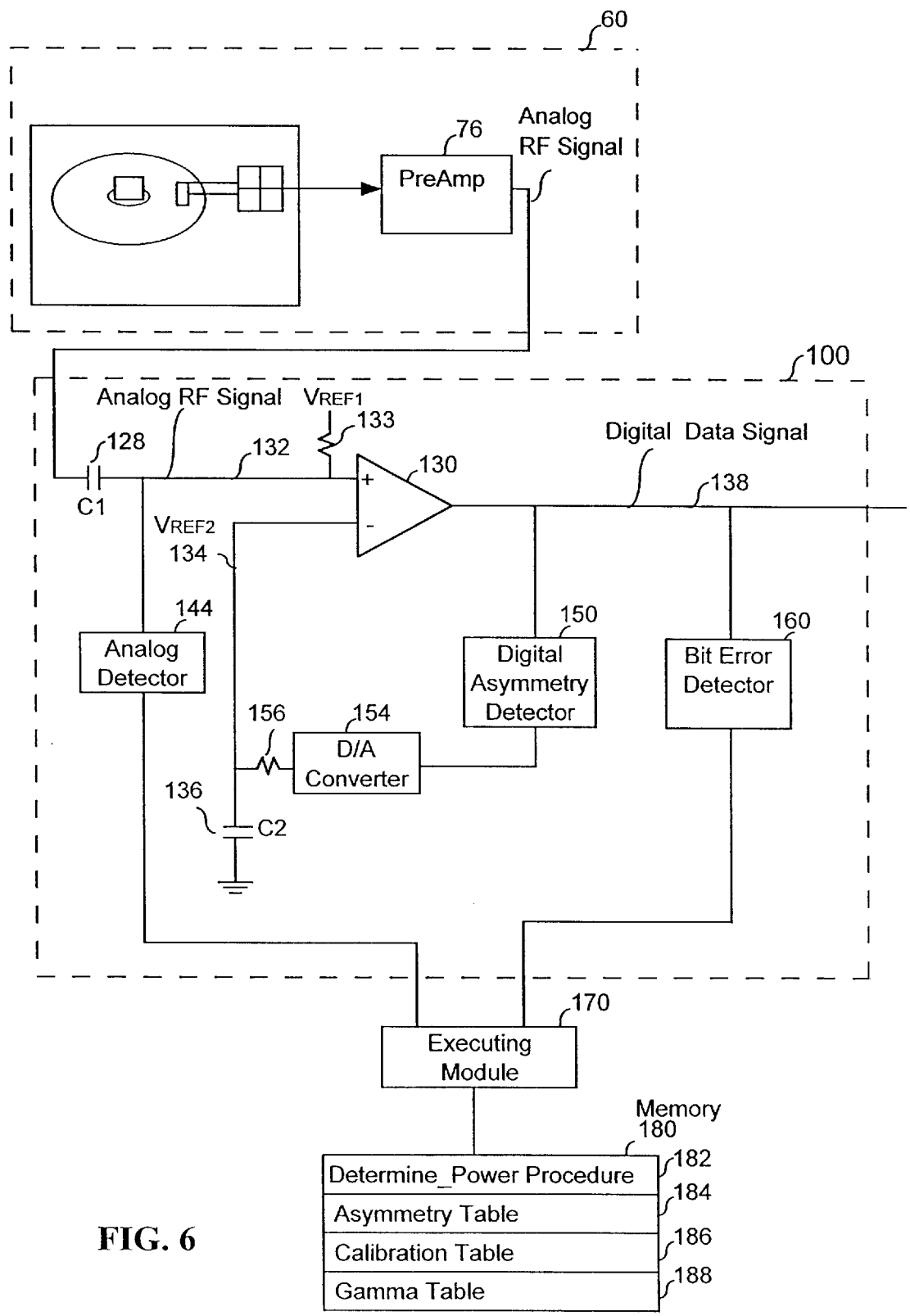
FIG. 6 illustrates a circuit that selects a power level associated with a write-pattern that generates a number of bit errors closest or equal to zero in accordance with an embodiment of the present invention.

In FIG. 6 a signal analysis block 100 is shown in more detail. The signal analysis block 100 receives the analog RF signal from the preamplifier 76 via capacitor (C1) 128. A comparator 130 receives the analog RF signal on a positive (+) input line 132. The DC bias of the analog RF signal is set by connecting the positive input line 132 to a resistor 133 that is attached to a first reference voltage $V_{REF1}$. The comparator 130 receives a second reference voltage $V_{REF2}$ on a negative input (−) line 134 which is coupled to ground via capacitor $C_2$ 136. The comparator 130 compares the analog RF signal to the second reference voltage $V_{REF2}$ and outputs the digital data signal on line 138. The digital data signal has a digital high value or a digital low value depending on the result of the comparison. In this way, the comparator 130 decodes the analog RF signal and outputs a stream of digital high and digital low values.

An analog detector 144 receives the analog RF signal from line 132 and provides the values to the system controller 90 to determine the values of Beta $\beta$ and Gamma $\gamma$ from the digital values of the peak, bottom, reference and average voltages as described above, depending of the type of disk drive.

A digital asymmetry detector 150 operates on the principle that, in EFM encoding, over a long period of time, the number of clock periods having a digital one value should be equal to the number of clock periods having a digital zero value. During a read operation, the digital asymmetry detector 150 supplies an eight-bit asymmetry value to the digital-to-analog (D/A) converter 154 to adjust the second reference voltage ($V_{REF2}$) via resistor 156. When the digital asymmetry detector 150 outputs a non-zero value, the number of clock periods having a digital one value is not equal to the number of clock periods having a digital zero value.

In a noteworthy aspect of the invention, a bit error detector circuit 160 provides a count of the number of bit errors which is used to determine the optimum write power. When reading the write-patterns to determine the optimum write power, an executing module 170 reads the number of bit errors from the bit error circuit 160.

In an alternate embodiment for CD-R drives, both the number of bit errors and the asymmetry value Beta are used to determine the optimum write power. The executing module 170 also reads the values to determine the asymmetry value Beta β from the analog asymmetry detector 144, and determines the asymmetry value Beta β from those values in accordance with relationship two described above. Based on the number of bit errors and the asymmetry value Beta β, the executing module 170 determines the optimum write power.

In one embodiment, the executing module 170 is the system controller 90 of FIG. 5. Alternately, the executing module 170 is a microprocessor that is coupled to a memory 180 storing a determine_power procedure 182. For a CD-R disk drive, the executing module 170 executes the determine_power procedure 182 which causes the executing module 170 to read the values of the peak, bottom and reference levels from the analog detector 144 for each write-pattern, generate the asymmetry values in accordance with relationship two, and store the asymmetry value in an asymmetry table 184 in the memory 180. Concurrently, the bit error detector 160 generates a number of bit errors and the determine_power procedure 182 causes the executing module 170 to read the number of bit errors from the bit error detector 160 and store the number of bit errors for each write-pattern in a calibration table 186 in the memory 180. In one embodiment, after determining the asymmetry values and number of bit errors for each write-pattern, the determine_power procedure 182, as processed by the executing module 170, designates the power level associated with a number of bit errors closest or equal to zero as the selected write power. Alternately the determine_power procedure 182 designates the power level based on both the number of bit errors and the asymmetry values. Another embodiment of the determine_power procedure 182 will be described in further detail with respect to FIG. 11 below.

In another alternate embodiment for CD-RW drives, both the number of bit errors and the slope of the modulation amplitude are used to determine the write power. The executing module 170 executes the determine_power procedure 182 which causes the executing module 170 to read the values of the peak, bottom and peak average levels from the analog detector 144 for each write-pattern, generate the gamma value in accordance with relationships five and six, and store the gamma value in a gamma table 188 in the memory 180. Concurrently, the bit error detector 160 generates a number of bit errors and the determine_power procedure 182 causes the executing module 170 to read the number of bit errors from the bit error detector 160 and store the number of bit errors for each write-pattern in a calibration table 186 in the memory 180. The determine_power procedure 182 designates the power level based on both the number of bit errors and the gamma values. An alternate embodiment of the determine_power procedure 182 will be described with respect to FIG. 15 below.

In another embodiment, the executing module 170 is a programmable logic array. In yet another embodiment, the executing module 170 is a hard-wired logic circuit or an ASIC.

On a disk, a power calibration area is a predetermined reserved area of the disk that is used to determine the optimum write power. In the power calibration area, a test area stores random EFM data, and a count area specifies which portion of the test area can be used for power calibration. The test area has 100 partitions; and each partition is fifteen ATIP frames long (15/75 or 0.2 seconds). Each partition starts at a fixed ATIP time and ends at the next partition. When a disk is inserted into the disk drive and data is to be written on that disk, one of the partitions in the test area is used to determine the write power at which to write the data.

The random EFM data is written to each ATIP frame of that one partition at a distinct predetermined power level for each ATIP frame. Random EFM data has the following characteristics. In the user data or main channel, random data symbols, equivalent to a white noise audio signal, are recorded. In a subcode channel, all subcode bytes, except the synchronization bytes and a cyclic redundancy check field, are set to a fixed value for each subcode frame, preferably "0xFF" or "0x00."

Figure 7:
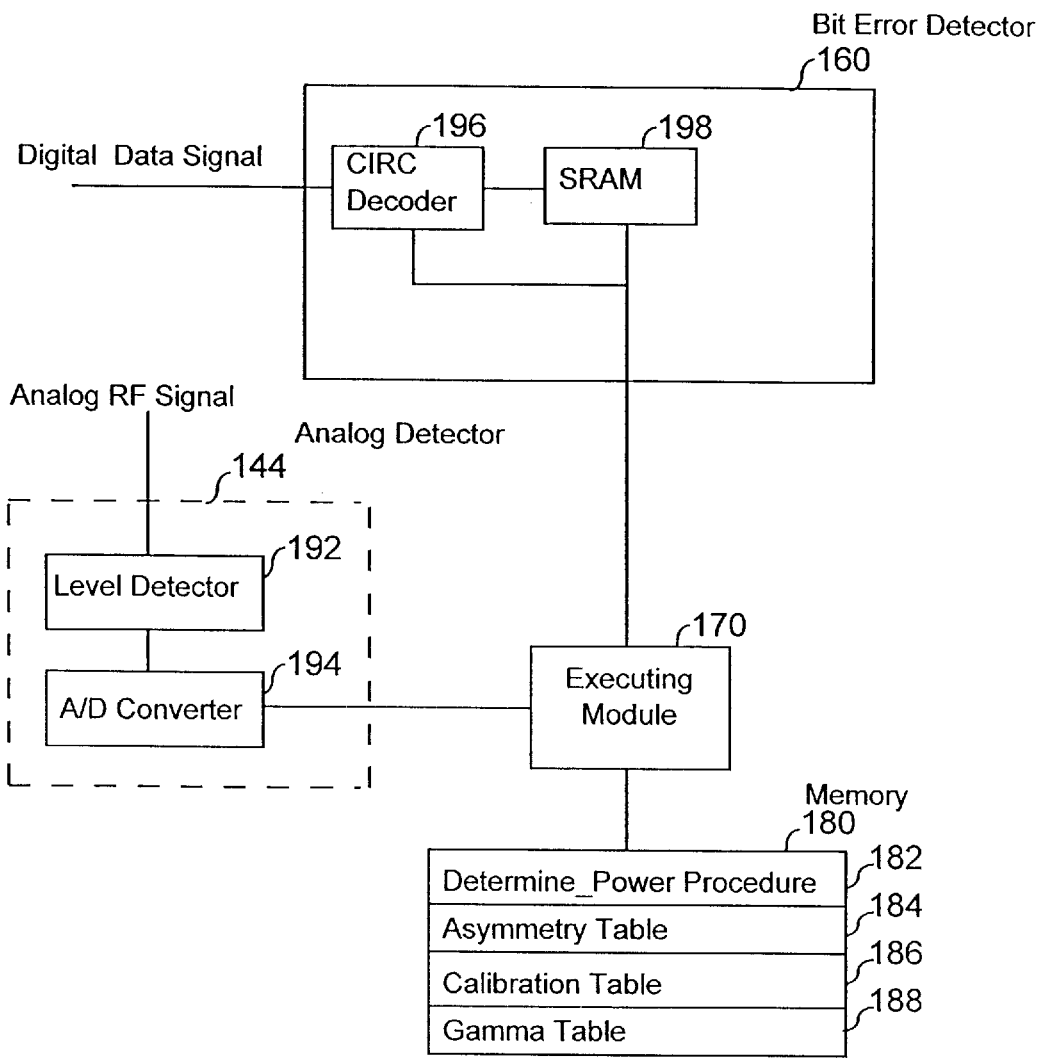
FIG. 7 illustrates the circuits that provide the number of bit errors and the analog asymmetry value of FIG. 6 in more detail.

As shown in FIG. 7, in the analog detector 144, a set of level detectors 192 receives the analog RF signal and outputs analog values representing the upper and lower peaks of the analog RF signal, a DC reference level, and a peak average level, depending on the type of disk drive. A set of analog-to-digital converters 194 convert the analog values to digital values. For simplicity, a simple level detector 192 and A/D convertor 194 are shown.

In the bit error detector 160, a CIRC decoder 196 receives the digital data signal, decodes the data signal into bytes of decoded data, and stores at least the decoded user data bytes in a static random access memory (SRAM) 198. The CIRC decoder 196 is a cross-interleave Reed-Solomon code decoder which also detects and corrects errors. The CIRC decoder 196 counts and provides a number of bit errors, referred to as C1 and C2 errors, for each ATIP frame. The present invention uses the number of C1 errors to determine the amount of write power. In an alternate embodiment, the number of C2 errors is used to determine the amount of write power.

Figures 8A, 8B:
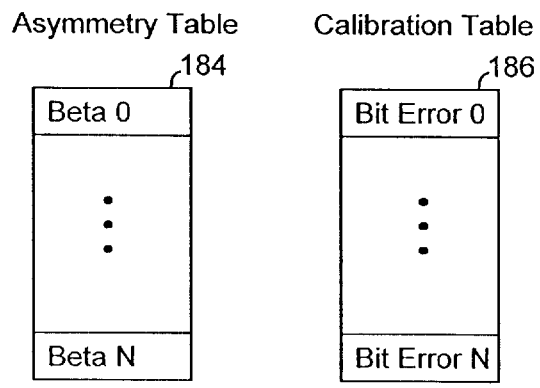
FIG. 8A illustrates an asymmetry table that stores the analog asymmetry value for a subset of write-patterns in accordance with an embodiment of the present invention.
FIG. 8B illustrates a calibration table that stores the number of bit errors for the subset of write-patterns in accordance with an embodiment of the present invention.

FIG. 8A shows an exemplary asymmetry table 184 that stores values of Beta β for each consecutive write-pattern. FIG. 8B shows an exemplary calibration table 186 that stores the number of bit errors from the CIRC decoder for consecutive write-patterns. In FIGS. 8A and 8B, the same location in each table is associated with the same write power. For example, Beta 0 and Bit Error 0 correspond to write-pattern 0, while Beta N and Bit Error N correspond to write-pattern N. In an alternate embodiment, the values of Beta β and the number of bit errors are stored in the same table.

Cross-interleave Reed-Solomon coding is an efficient error correcting code that corrects a maximum burst error of about 450 symbols (about 1.9 ms) and provides a concealment length of about 1,500 symbols. A symbol is eight bits.

Figure 9:
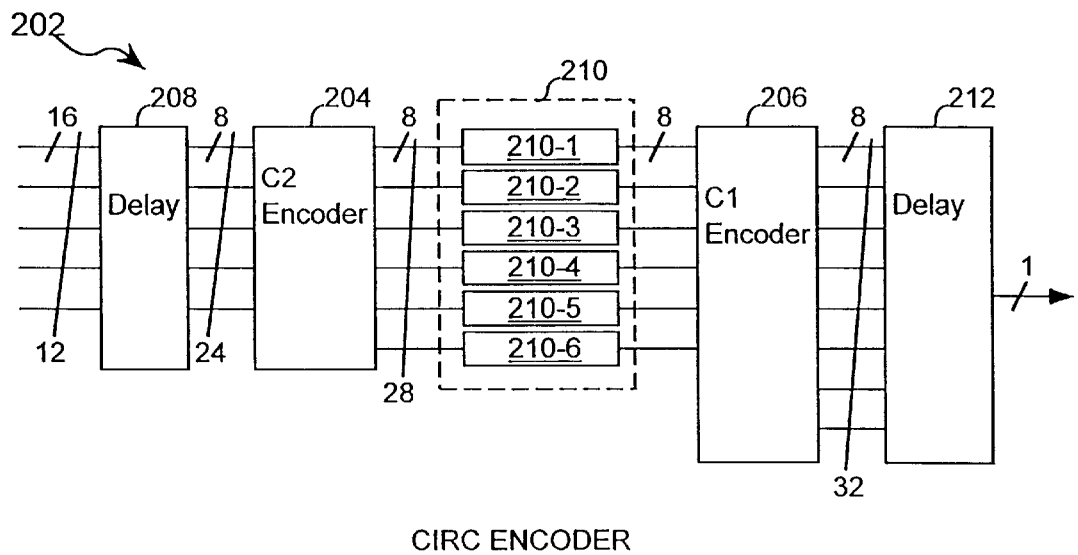
FIG. 9 illustrates a block diagram of a cross-interleave Reed-Solomon (CIRC) encoder.

In FIG. 9, a CIRC encoder 202 uses two Reed-Solomon Codes, called C1 and C2, to encode the data for subsequent error detection and correction. The CIRC encoder 202 has a C2 encoder 204 and a C1 encoder 206 that encodes data using two encoding schemes. A first encoder-delay block 208 receives an input signal of twelve sixteen-bit words. The first encoder-delay block 208 delays a subset of the input signals for an interval of time equal to two symbols to facilitate concealment of errors in simplified decoders. The first encoder-delay block 208 supplies twenty-four symbols of eight bits each to the C2 encoder 204. In one implementation which records music on a disk, an analog-to-digital converter may supply the input signal. Alternately, the input signal may be digital data.

The C2 encoder 204 generates twenty-eight C2 encoded symbols from the symbols output by the first delay block 208. The C2 encoder 204 encodes the twenty-four symbols from the first delay block 208 and includes four additional C2 parity symbols. In mathematical terms, the C2 encoder 204 uses a C2 code which is a (28, 24) Reed-Solomon Code over a Galois Field of $2^8$.

A set of interleaving encoder delay blocks 210 is between the C2 encoder 204 and the C1 encoder 206. The encoder delay blocks 210 of the set of encoder delay blocks 210 provide delayed-C2-encoded symbols by delaying each incoming symbol with a different amount of delay.

The C1 encoder 206 generates thirty-two C1–C2-encoded symbols from the delayed-C2-encoded symbols that include the twenty-eight symbols from the set of interleaving delay blocks 210 and also includes four additional C1 parity symbols. In mathematical terms, the C1 encoder 206 uses a C1 code which is a (32, 28) Reed-Solomon Code over Galois Field of $2^8$.

A second encoder-delay block 212 delays a subset of the C1–C2-encoded symbols for an amount of time equal to one symbol and outputs the delayed and undelayed C1–C2-encoded symbols which will be stored on the disk.

Figure 10:
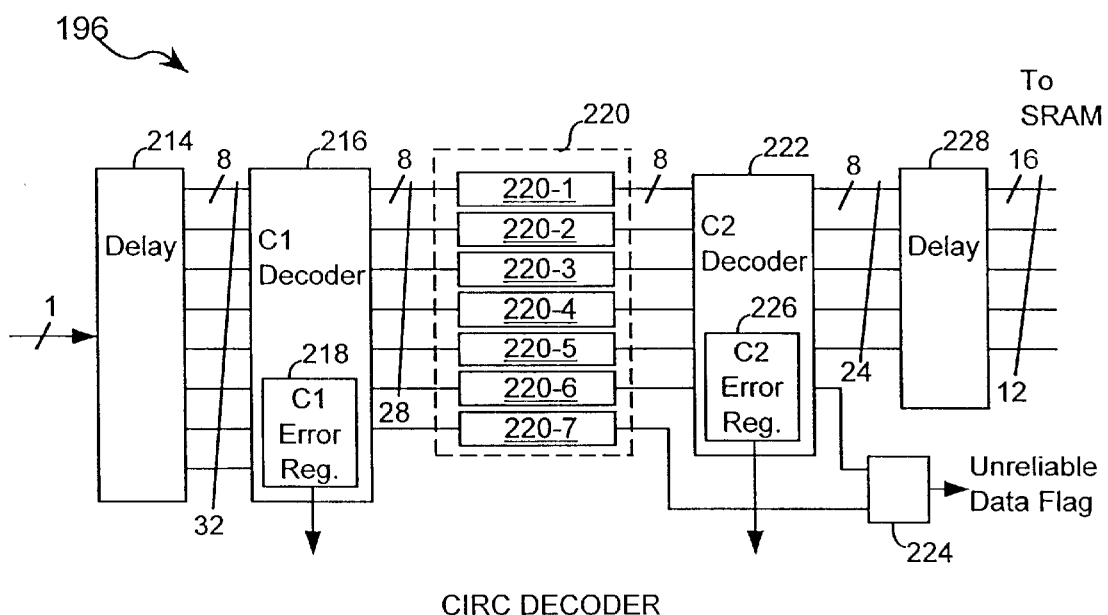
FIG. 10 illustrates a block diagram of a CIRC decoder of FIG. 7 that provides the number of bit errors.

In FIG. 10, a CIRC decoder 196 decodes data received from the disk. A first decoder-delay block 214 receives an input signal of thirty-two symbols, each having eight bits, that includes the four C1 parity symbols and delays a subset of the symbols of the input signal for an amount of time equal to one symbol. The first decoder-delay block 214 outputs delayed-input signals.

A C1 decoder 216 decodes the symbols from the first decoder-delay block 214 and outputs decoded-C1-symbols. Using a decoder implementing the C1 code described above with respect to FIG. 9, when one symbol error out of the thirty-two symbols is detected, the C1 decoder 216 corrects the erroneous symbol. If there is more than one erroneous symbol, then regardless of the number of errors, the C1-decoder 216 detects that it received an uncorrectable symbol of thirty-two symbols. When an uncorrectable symbol is detected, the C1 decoder 216 outputs the twenty-eight non-C1-parity symbols without correction, and sets an erase flag for each symbol to indicate that the symbol may not be reliable. The C1 decoder 216 includes a C1 error register 218 which counts the number of C1 errors in an ATIP frame. The C1 error register 218 is reset after reading each ATIP frame, prior to reading the next EFM frame. Preferably the C1 error register 218 is double-buffered to provide sufficient time for the executing module to read the C1 error rate.

A set of interleaving-decoder-delay blocks 220 is between the C1 decoder 216 and a C2 decoder 222. Each decoder-delay block 220 of the set of interleaving-decoder-delay blocks 220 delays each decoded-C1 symbol by a different amount of time corresponding to the interleaving-encoder-delay blocks 210 (FIG. 9). The set of interleaving-decoder-delay blocks 220 outputs de-interleaved-decoded-C1 symbols.

The C2 decoder 222 decodes the de-interleaved-decoded-C1 symbols and outputs decoded-C2-symbols. Because the delay blocks of the set of interleaving-decoder-delay blocks 220 provide different amounts of delay for each de-interleaved-decoded-C1 symbol, the de-interleaved-decoded-C1 symbols that are marked with an erasure flag at a single point in time by the C1 decoder 216, arrive at the C2 decoder 222 at different times. The C2 decoder 222 has for each symbol an indication of whether that symbol is unreliable. When the erasure flag is not set for a symbol, that symbol has no error. When the erasure flag is set for a symbol, that symbol has an error. When four or fewer symbols have an error, the C2 decoder 222 corrects the error in those symbols. The combination of the C1 and C2 decoders, 216 and 222, respectively, with interleaving allows for burst errors of up to 450 symbols to be corrected.

When more than four symbols have an error and the C2 decoder 222 cannot correct the error, the C2 decoder 222 passes the twenty-four data symbols without correction with the set erasure flags from the C1 encoder 216. The C2 decoder 222 also sets a C2-erasure flag for those symbols. A flag circuit 224 combines the C1-erasure flags and C2-erasure flags to produce an unreliable data signal that is used by subsequent circuitry to conceal the error.

The C2 decoder 222 includes a C2 Error Register 226 that counts the number of C2 errors. The C2 error register 226 is reset after reading each ATIP frame, prior to reading the next EFM frame. Preferably the C2 error register 226 is double-buffered to provide sufficient time for the executing module to read the C2 error rate.

A second decoder-delay block 228 delays a subset of the decoded-C2-symbols for an amount of time equal to two symbols prior to storing the symbols in the SRAM 198 (FIG. 7).

Figure 11:
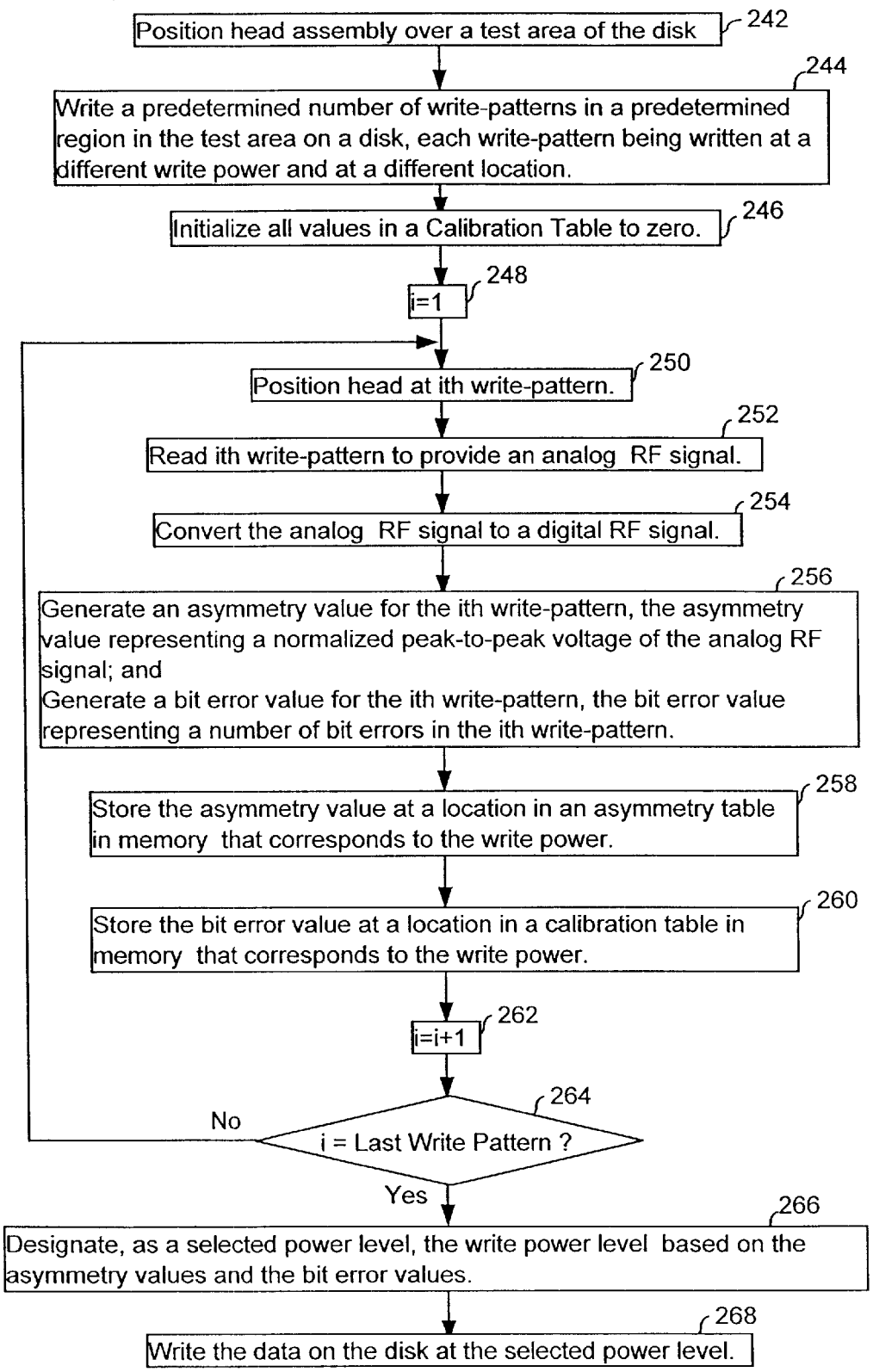
FIG. 11 is a flowchart of a method of selecting a write power level associated with a write-pattern that generates a number of bit errors closest or equal to zero.

FIG. 11 shows a method of implementing the determine_power procedure 82 of FIG. 7. In step 242, the determine_power procedure 82 (FIG. 7) positions the head assembly over a test area of the disk. In step 244, a predetermined number of write-patterns are written in a predetermined region in the test area of the disk. Each write-pattern is written at a different write power and at a different location. In step 246, all values of the calibration table 186 (FIG. 8B) are initialized to equal zero.

In step 248, value of a write-pattern counter, i, is set equal to one. The write-pattern counter, i, is used to identify the particular write-pattern associated with a distinct power level that is currently being read. In step 250, the head is positioned at the ith write-pattern as specified by the write-pattern counter. In step 252, the ith write-pattern is read to provide an analog RF signal. In step 254, the analog RF signal is converted to the digital data signal. In step 256, the determine power procedure determines the asymmetry value Beta β based on the output of the analog detector 144 (FIG. 7). The asymmetry value Beta β represents a normalized difference of the peak values of the high and low frequency components of the RF (read) signal for the write-pattern. The CIRC decoder 196 (FIG. 10) generates a count of the number of bit errors for the write-pattern, that is, the number of C1 errors. The analog detector 144 (FIG. 7) and the CIRC decoder 196 (FIG. 10) operate simultaneously to generate their respective values.

In step 258, the asymmetry value Beta β is stored in the asymmetry table 184 (FIG. 8A) at a location corresponding to the ith write-pattern. In step 260, the generated number of bit errors for the ith write-pattern is stored at a location in the calibration table for the ith write pattern. In step 262, the write-pattern counter, i, is incremented by one. Step 264 determines whether all the write-patterns have been read by comparing the value of the write-pattern counter, i, to a predetermined Last Write-pattern value. If the value of the write-pattern counter, i, does not equal the predetermined last write-pattern value the process repeats for the next write-pattern at step 250. In one embodiment, the predetermined last write-pattern value is equal to fifteen. If the value of the write-pattern counter, i, equals the predetermined last write-pattern value, in step 266, the determine_power procedure designates, as a selected power level, the write power level based on the asymmetry values and the bit error values. In an alternate embodiment, the determine_power procedure designates the write power level based only on the bit error values. In step 268, the data is stored on the disk at the selected power level.

Figure 12:
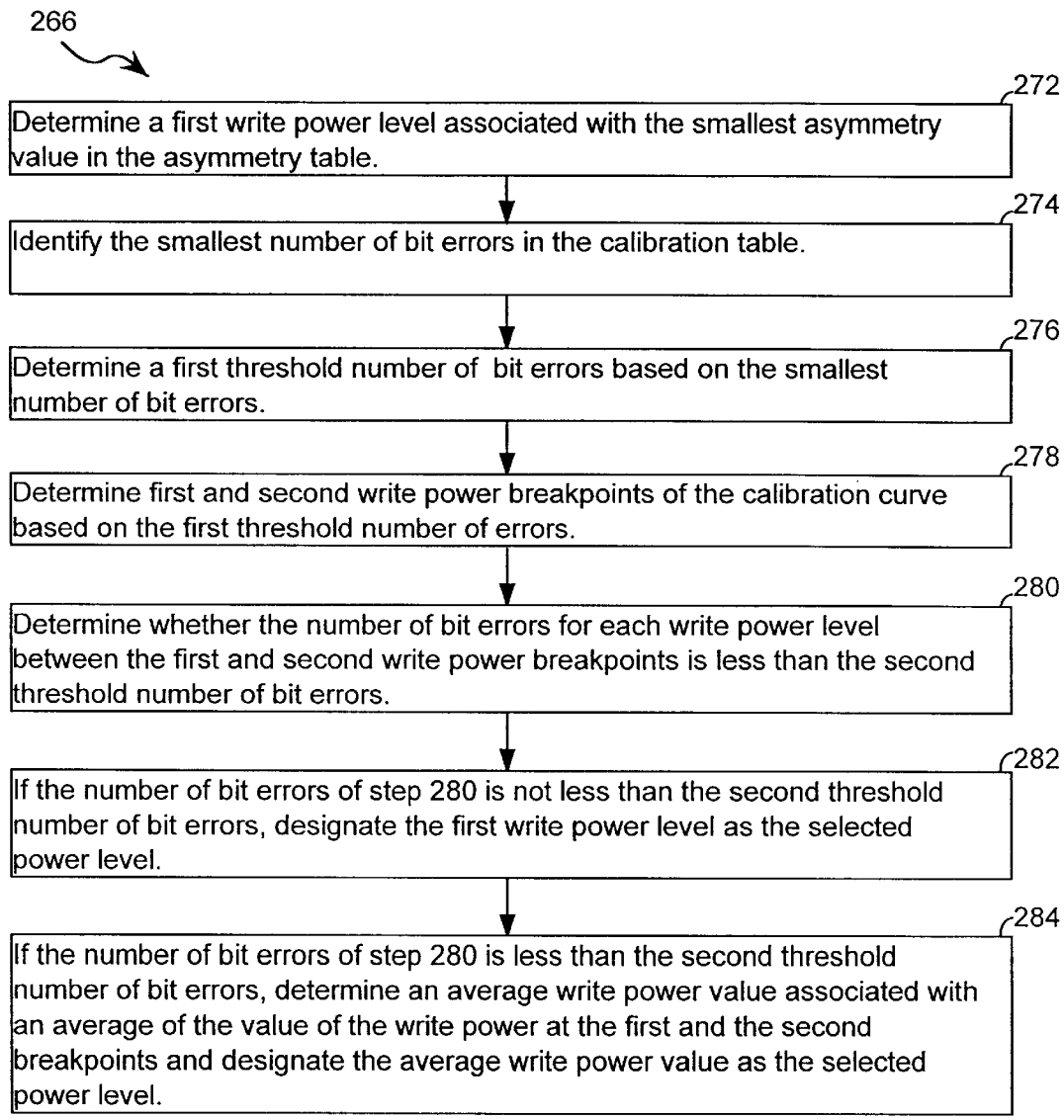
FIG. 12 is a detailed flowchart of the method of designating the write power level of FIG. 11 in accordance with an embodiment of the present invention.

In FIG. 12, a flowchart illustrates step 266 of the method of designating the write power level in detail. In step 272, the determine_power procedure 182 (FIG. 7) determines a first write power level. The first write power level is associated with the smallest asymmetry value stored in the asymmetry table of FIG. 8A. The smallest asymmetry value is that asymmetry value that is closest or equal to zero. In step 274, the smallest number of bit errors for a write power in the calibration table is determined.

During normal operation, the calibration curve will have first and second write power "breakpoints" denoting a range of write power levels having a sufficiently small number of bit errors. A first threshold number of bit errors is used to identify the first and second write power breakpoints. In step 276, the first threshold number of bit errors is determined based on the smallest number of bit errors. In one embodiment, the first threshold number of bit errors is equal to the smallest number of bit errors plus a predetermined increment. In one embodiment, the predetermined increment is a constant. In an alternate embodiment, the predetermined increment is equal to the maximum number of bit errors multiplied by a predetermined scale factor. Alternately, the first threshold number of bit errors is equal to the smallest number of bit errors multiplied by a predetermined breakpoint factor.

In step 278, the determine_power procedure determines first and second write power breakpoints of the calibration curve based on the first threshold. The first write power breakpoint is the point at which the number of bit errors is greater than the first threshold when decreasing the laser power with respect to the laser power associated with the smallest number of bit errors. The second write power breakpoint is the point at which the number of bit errors is greater than the first threshold when increasing the laser power with respect to the laser power associated with the smallest number of bit errors.

In step 280, the determine_power procedure determines whether the number of bit errors increased sharply for any of the write powers between the first and second write power breakpoints. In other words, the determine_power procedure identifies any spikes in the number of bit errors. A spike in the number of bit errors at any point indicates that a media defect lies in the power calibration area, the bit errors and Beta for the location of the spike are ignored.

The determine_power procedure determines whether the number of bit errors for each write power level between the first and second write power breakpoints is less than a second predetermined bit error threshold. The second predetermined bit error threshold is equal to fifty C1 errors.

In step 282, the number of bit errors of step 280 is not less than the second threshold number of bit errors, the determine_power procedure designates the first write power level as the selected power level because the calibration curve has a "spike" in the number of bit errors at the second threshold; therefore, the second threshold is not a reliable indicator of subsequent disk performance. If a spike is detected, the number of errors at that location is disregarded.

In step 284, if the number of bit errors of step 280 is less than the second threshold number of bit errors, the determine_power procedure determines an average write power value associated with an average of the values of the first and second write power breakpoints, and designates the average write power value as the selected power level.

In an alternate embodiment, only the number of bit errors is used to determine the write power level. Steps 272 and 282 are not performed, and step 284 does not condition the determination of the average write power value based on the relationship between the number of bit errors and the second threshold number of bit errors.

Table one below shows exemplary values of the write power, Beta, the number of C1 Errors and the laser power for CD-R disk drive. The values for a CD-RW disk drive are similar.

TABLE 1

Exemplary Write Power, Beta, C1 Error and Laser Power for a CD-R disk drive

| Write Power | Measured Values | | Calculated Values Laser Power |
|---|---|---|---|
| (Decimal value) | Beta | C1 Error | (milliwatts) |
| 48 | −10.00% | 5,800 | 3.06 |
| 64 | −12.00% | 5,800 | 4.89 |
| 80 | −5.00% | 600 | 6.34 |
| 96 | −9.70% | 120 | 7.80 |
| 112 | −8.80% | 50 | 9.40 |
| 128 | −1.50% | 20 | 10.60 |
| 144 | 8.30% | 400 | 11.80 |
| 160 | 11.30% | 5,400 | 13.80 |
| 176 | 15.00% | 5,000 | 15.20 |
| 192 | | | 16.80 |
| 208 | | | 18.40 |
| 224 | | | 20.40 |
| 240 | | | 22.40 |

Figure 13:
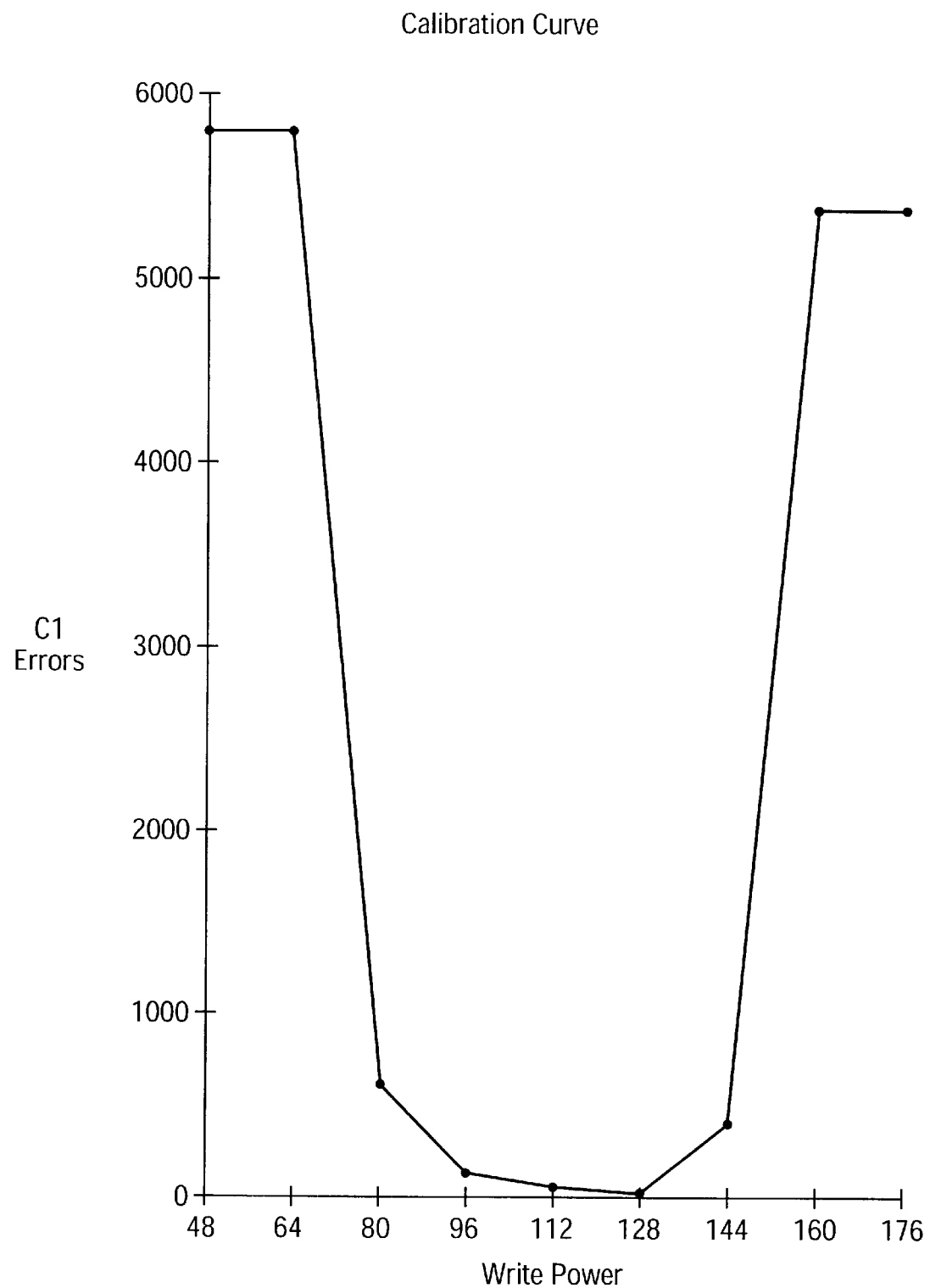
FIG. 13 is a graph of an exemplary calibration profile in accordance with the present invention.

FIG. 13 is an exemplary calibration curve of a graph of the number of C1 errors versus write power of table one. Because the number of C1 errors exceeds 5,000 for write power levels greater than 192, such data is not used to determine the optimum write power and is not shown. The decimal value of the write power is directly proportional to the actual write power applied to the laser.

In table one, the write power for the value of 128 provides the smallest value of Beta (20). The C1 Error for the write power of 128 has the smallest value. Therefore, in this example, using the C1 Error and Beta provides the same result.

To determine the breakpoints of the calibration curve, the determine_power procedure 82 (FIG. 6) determines the difference in the C1 error rate between consecutive write power settings. Because the difference in the C1 error rate is greatest between write power values of 64 and 80, and 144 and 160. The break points are between the pairs write power values of 64 and 80, and 144 and 160. In one embodiment, the breakpoints are the midpoint of these pairs of write power values—74 and 152. In an alternate embodiment, the breakpoints are set to the write power value of each pair of write power values having the smaller error rate.

In FIG. 14, an alternate embodiment of the method of designating the write power level of step 240 is shown. Steps 272–278 are the same as in FIG. 12 and will not be described. The method of FIG. 14 uses the number of measured write power increments between the first and second write power breakpoints to identify "spikes" in the number of bit errors because a spike will appear to pull the breakpoints closer together.

In step 286, the number of measured write power increments between the first and second write power breakpoints is determined. In step 288, if the number of write power increments is less than a predetermined number of write power increments, the determine_power procedure designates the first write power level as the selected power level. In step 290, if the number of write power increments is greater than or equal to the predetermined number of write power increments, the determine_power procedure determines an average write power as described with respect to step 274 of FIG. 12, and designates the average write power value as the selected write power level.

Figure 15:
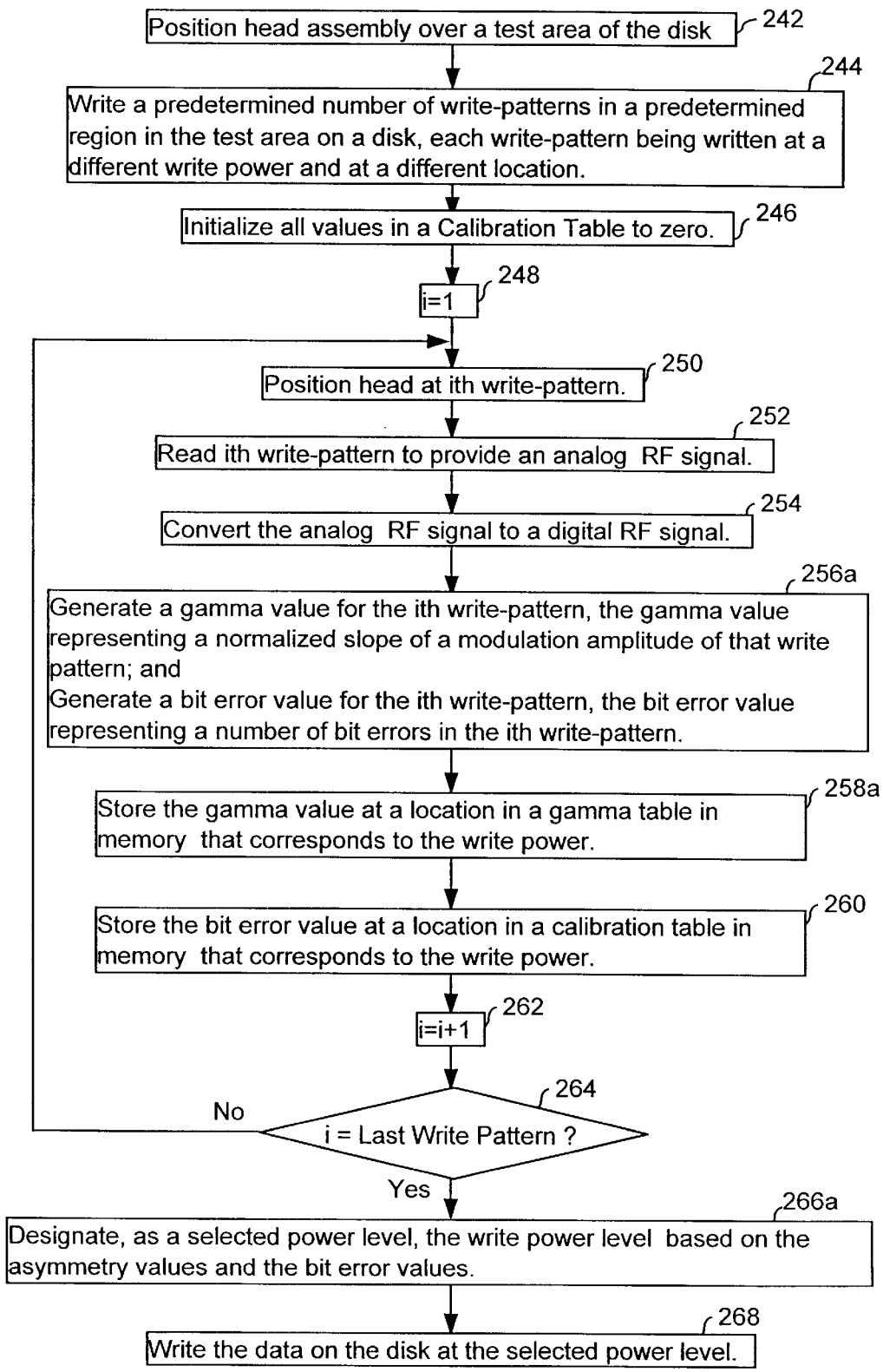
FIG. 15 is a flowchart of a method of selecting a write power level based on the number of bit errors and a slope of the modulation amplitude of the RF signal.

Referring to FIG. 15, a flowchart of an embodiment of the determine_power procedure 82 (FIG. 6) for a CD-RW drive is shown. FIG. 15 is the same as FIG. 11, except that steps 256a and 258a generate and store a gamma value, respectively, rather than an asymmetry value, and step 266a designates the write power level based on the gamma value, rather than the asymmetry value.

Figure 16:
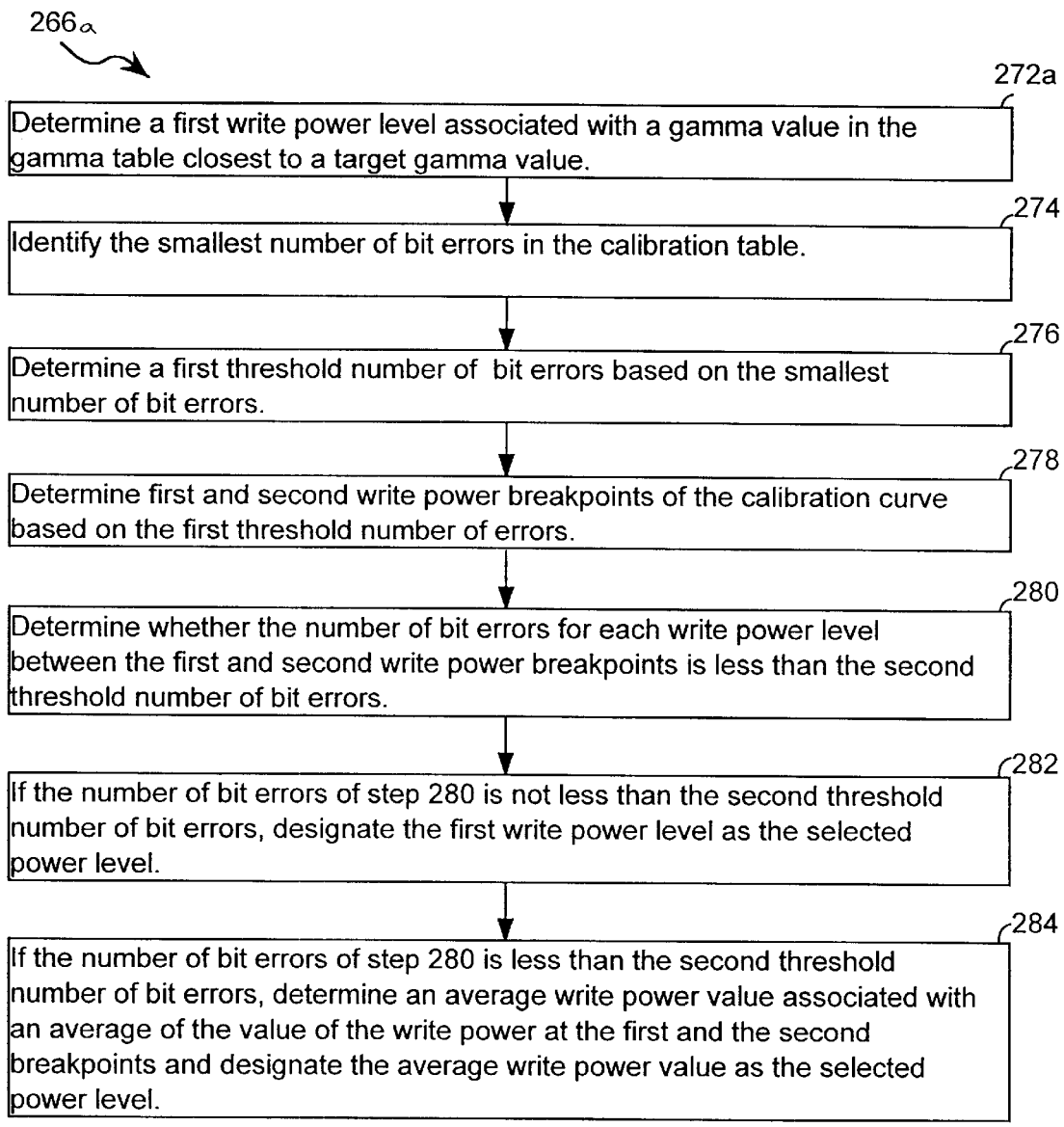
FIG. 16 is a detailed flowchart of the method of designating the write power level of FIG. 15 in accordance with an embodiment of the present invention.

FIG. 16 shows a flowchart of an embodiment of step 266a of FIG. 15 which designates the write power level. FIG. 16 is the same as FIG. 12 except that step 272a determines a first write power level based on a gamma value, as described above, rather than the asymmetry value.

The invention is also applicable to other disk drive systems including magneto-optical and magnetic disk drives.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A method of determining a power value for writing data on a disk, comprising:

writing write-patterns on a disk, each write-pattern being written at an associated power value;

reading said write-patterns;

determining a bit error corresponding to said write-patterns to generate a calibration profile of associated bit errors and power values;

determining an asymmetry value corresponding to said write-patterns, wherein said asymmetry value is a normalized peak-to-peak difference of said write-pattern; and designating a selected power value based on said calibration profile and said asymmetry value.

2. The method of claim 1 wherein said determining an asymmetry value and said determining said bit error are performed simultaneously.

3. The method of claim 1 further comprising:

writing data on said disk using said designated power value.

4. The method of claim 1 wherein said bit errors are generated using a cross-interleave Reed-Solomon coding.

5. The method of claim 1 wherein each write-pattern is associated with a distinct power value.

6. The method of claim 1 wherein said designating a selected power value based on said calibration profile includes:

determining a write power based on said bit errors of said calibration profile, said calibration profile having breakpoints based on said bit errors, wherein said write power is associated with an average of write power levels associated with said breakpoints.

7. A method of determining a power value for writing data on a disk, comprising:

writing write-patterns on a disk, each write-pattern being written at an associated power value;

reading said write-patterns;

determining a bit error corresponding to said write-patterns to generate a calibration profile of associated bit errors and power values;

determining a gamma value corresponding to said write-patterns, wherein said gamma value is a normalized slope of a modulation amplitude of said write-pattern; and designating a selected power value based on said calibration profile and said gamma value.

8. The method of claim 7 wherein said determining a gamma value and said determining said bit error are performed simultaneously.

9. The method of claim 7 further comprising:

writing data on said disk using said designated power value.

10. The method of claim 7 wherein said bit errors are generated using a cross-interleave Reed-Solomon coding.

11. The method of claim 7 wherein each write-pattern is associated with a distinct power value.

12. The method of claim 7 wherein said designating a selected power value based on said calibration profile includes:

determining a write power based on said bit errors of said calibration profile, said calibration profile having breakpoints based on said bit errors, wherein said write power is associated with an average of write power levels associated with said breakpoints.

13. A circuit for determining a power value for writing data on a disk, comprising:

a circuit to write write-patterns on the disk, each write-pattern being written at a predetermined write power;

an error detector to determine bit errors for said write-patterns;

a sample and hold circuit to determine asymmetry values, each asymmetry value corresponding to one of said write-patterns, wherein said asymmetry value is a normalized peak-to-peak difference of said write-pattern; and an executing module to designate a selected power value based on said bit errors and said asymmetry values.

14. A circuit for determining a power value for writing data on a disk, comprising:
- a circuit to write write-patterns on the disk, each write-pattern being written at a predetermined write power;
- an error detector to determine bit errors for said write-patterns;
- a sample and hold circuit to determine gamma values, each gamma value corresponding to one of said write-patterns, wherein said gamma value is a normalized slope of a modulation amplitude of said write-pattern; and
- an executing module to designate a selected power value based on said bit errors and said gamma values.

15. A disk controller, comprising:
- a servo system generating signals to cause an actuator to position a head over a target track on a disk, said servo system also generating at least one rotation signal to cause a spindle motor to rotate said disk, said head providing an analog RF signal;
- a circuit to write write-patterns on the disk, each write-pattern being written at a predetermined write power;
- a comparator generating a digital data signal based on said analog RF signal and a reference voltage corresponding to said write-patterns;
- an error detector to determine bit errors, each bit error corresponding to the one write-pattern of said write-patterns; and
- a sample and hold circuit to determine asymmetry values, each asymmetry value corresponding to one write-pattern of said write-patterns, wherein said asymmetry value is a normalized peak-to-peak difference of said one write-pattern, and said executing module designates said selected power value based on said bit errors and said asymmetry values.

16. The disk controller of claim 15 further comprising:
- a memory storing said asymmetry values for said write-patterns, each write-pattern being associated with a power value, and storing said bit errors for said write-patterns;
- wherein said executing module designates said selected power value based on said asymmetry values and said bit errors stored in said memory.

17. The disk controller of claim 15 wherein said memory stores a power determination procedure that stores said asymmetry values and said bit errors in said memory for each of said write-patterns,
- said executing module to execute said power determination procedure to cause said write-patterns to be read, and store said asymmetry values and said bit errors in said memory for each write-pattern of said plurality of write-patterns, and to select, as a selected power value, said power value associated with one of said write-patterns that has a bit error below a predetermined bit error threshold and an associated asymmetry value closest or equal to zero; and
- a write strategy circuit that outputs write data signals to write data on said disk using said selected power value.

18. A disk controller, comprising:
- a servo system generating signals to cause an actuator to position a head over a target track on a disk, said servo system also generating at least one rotation signal to cause a spindle motor to rotate said disk, said head providing an analog RF signal;
- a circuit to write write-patterns on the disk, each write-pattern being written at a predetermined write power;
- a comparator generating a digital data signal based on said analog RF signal and a reference voltage corresponding to said write-patterns;
- an error detector to determine bit errors, each bit error corresponding to the one write-pattern of said write-patterns; and
- a sample and hold circuit to determine gamma values, each gamma value corresponding to one write-pattern of said write-patterns, wherein said gamma value is a normalized slope of a modulation amplitude of said write-pattern, and said executing module designates said selected power value based on said bit errors and said gamma values.

19. The disk controller of claim 18 further comprising:
- a memory storing said gamma values for said write-patterns, each write-pattern being associated with a power value, and storing said bit errors for said write-patterns;
- wherein said executing module designates said selected power value based on said gamma values and said bit errors stored in said memory.

20. The disk controller of claim 18 wherein said memory stores a power determination procedure that stores said gamma values and said bit errors in said memory for each of said write-patterns,
- said executing module to execute said power determination procedure to cause said write-patterns to be read, and store said gamma values and said bit errors in said memory for each write-pattern of said plurality of write-patterns, and to select, as a selected power value, said power value associated with one of said write-patterns that has a bit error below a predetermined bit error threshold and an associated gamma value closest or equal to a target gamma value; and
- a write strategy circuit that outputs write data signals to write data on said disk using said selected power value.

21. A method of determining a power value for writing data on a disk, comprising:
- writing write-patterns on a disk, each write-pattern being written at an associated power value;
- reading said write-patterns;
- determining a bit error corresponding to said write-patterns to generate a calibration profile of associated bit errors and power values; and
- designating a selected power value based on said calibration profile;
- wherein said designating designates a selected power value by:
  - determining a write power based on said bit errors of said calibration profile, said calibration profile having breakpoints based on said bit errors, wherein said write power is associated with an average of write power levels associated with said breakpoints.

22. A method of determining a power value for writing data on a disk, comprising:
- writing write-patterns on a disk, each write-pattern being written at an associated power value;
- reading said write-patterns;
- determining a bit error corresponding to said write-patterns to generate a calibration profile of associated bit errors and power values;
- determining one or more write power breakpoints from said calibration profile, wherein said one or more write power breakpoints are points on the calibration profile where the number of bit errors is less than a first threshold number; and designating a selected power value based on said calibration profile, wherein said designating designates said selected power value based on one or more of said write power breakpoints.

23. A circuit for determining a power value for writing data on a disk, comprising:

a circuit to write write-patterns on the disk, each write-pattern being written at a predetermined write power;

an error detector to determine bit errors for said write-patterns; and an executing module to:
  generate a calibration profile of associated bit errors and power values;
  determine one or more write power breakpoints from said calibration profile; and
  designate a selected power value based on said calibration profile;

wherein said one or more write power breakpoints are points on the calibration profile where the number of bit errors is less than a first threshold number.

* * * * *